Dec. 13, 1960 E. H. DINGER 2,964,691
CONSTANT CURRENT MOTOR CONTROL
Filed Aug. 12, 1958 3 Sheets-Sheet 1

INVENTOR:
EDWARD H. DINGER,
BY *Melvin M. Goldenberg*
HIS ATTORNEY.

Dec. 13, 1960 E. H. DINGER 2,964,691
CONSTANT CURRENT MOTOR CONTROL
Filed Aug. 12, 1958 3 Sheets-Sheet 2

INVENTOR:
EDWARD H. DINGER,
BY Melvin M. Goldenberg
HIS ATTORNEY.

Dec. 13, 1960   E. H. DINGER   2,964,691
CONSTANT CURRENT MOTOR CONTROL
Filed Aug. 12, 1958   3 Sheets-Sheet 3

INVENTOR:
EDWARD H. DINGER,
BY Melvin M. Goldenberg
HIS ATTORNEY.

United States Patent Office 2,964,691
Patented Dec. 13, 1960

2,964,691

CONSTANT CURRENT MOTOR CONTROL

Edward H. Dinger, Waynesboro, Va., assignor to General Electric Company, a corporation of New York Filed Aug. 12, 1958, Ser. No. 754,548

9 Claims. (Cl. 318—338)

The present invention relates to motor control systems and more partiularly to a constant current control system for D.C. motors.

In basic constant current D.C. motor control systems, the armature current is maintained at all times at 100% rated value and speed and torque regulation is effected by controlling the current to the shunt field of the motor. In order to regulate the current to the armature of the motor conventional current sensing apparatus, such as current transformers or current shunts, may be connected in series with the armature circuit and a signal developed from such a circuit is compared with a signal indicating the desired armature current. The comparison of these two signals produces an error signal which is applied to a current regulator for the purpose of regulating the armature current so that the error signal is reduced.

In order to control the motor field there is provided a speed reference signal and a tachometer generator which produces a signal indicative of the true speed of the motor. The two signals, that indicating true speed and that indicating desired speed, are compared and an error signal is produced which is fed to a motor field regulator such as to effect correction of the motor field to the extent necessary to bring the motor to the desired speed.

The constant armature current motor control system differs from the variable armature voltage control system in that in the former system, field current is increased as its shaft load increases whereas in the variable voltage system motor torque is increased if field current is decreased since a decrease in field current decreases the back E.M.F. in the motor control circuit and therefore permits an increase in armature current resulting in a net increase in torque. Another major distinction between the constant armature current system and the variable voltage armature control system is that in the former by employing a field control system capable of applying currents to the field in opposite directions, rapid changes from positive to negative torque may be effected while in a variable voltage armature system of the rectifier type reverse torque cannot be effected without requiring a complex dynamic breaking circuit to provide for a very rapid slow down in the rotational speed of the armature before reversing armature current.

The basic constant current system in which the armature is operated at full current rating at all times, has several inherent defects. More particularly, operating the machine at rated armature current requires the armature to be passing full load current even under no load or light load conditions and therefore the armature is always subjected to rated heating and commutating conditions which materially affects the maintenance requirements and the life of the apparatus. Another disadvantage of operating at 100% armature current is that a motor operated at full armature voltage at all times cannot be satisfactorily operated in the field speed range under full load conditions since the increase in speed would require an increase in field current resulting in a back E.M.F. across the armature which would materially reduce if not completely prevent the flow of armature current through the armature.

In order to overcome the above difficulties in the basic constant armature current control system, the basic circuit is modified by the addition of an armature current forcing circuit and an armature voltage limit circuit. The armature current forcing circuit permits the armature to be operated at a value of current below its full current rating and in accordance with the present invention is operated normally at 50% of full rating. If the torque requirements of the motor are such that the field current rises to maximum value any further increase in torque of speed requirements produces a signal which raises or increases the armature current above its normal constant current value until the torque and/or speed requirements are satisfied. This features serves the additional function in that a call for a very rapid increase in speed or torque in response to an increased load permits both the armature and field circuits to respond and thereby decreases the response time of the system.

The voltage limit circuit serves to permit operation of the system over a relatively large speed range including the range above rated base speed even under high or full load conditions. It is apparent that in any motor control system, the armature back E.M.F. cannot be permitted to rise above the value of the voltage supplied by the current regulator which supplies current to the armature. Since the motor field flux determines the back E.M.F. of the armature, it is apparent that at high load or full load conditions an increase in speed may produce an armature back E.M.F. condition which exceeds rated. If such an event occurs, the voltage limit signal is developed which prevents the field current from being further increased and which thereby brings into action the armature current forcing signal to now cause the armature current to increase to assume the increased load.

As previously indicated the motor field may be reversed and the negative torque feature of the invention permits the motor to be run in either forward or reverse direction and further permits a reverse torque to be developed although the motor is running at forward speed in order to brake overhauling loads. In some installations it is desirable to prevent the motor from reversing but to permit reverse torque to be developed in order to brake an overhauling load being driven in the forward direction. Therefore, an anti-reversing circuit is provided which permits a reverse torque to be developed as long as the tachometer speed voltage indicates that the armature is turning in the forward direction. As soon as the circuit detects that the armature is almost at zero speed and that the torque being developed is a reverse torque, the reverse motor field control circuits are de-energized and the motor is halted.

It is an object of the present invention to provide a constant armature current motor control system employing armature current forcing and voltage limit control circuits so as to brake overhauling loads and permit regenerative braking without subjecting the motor to excessive currents or voltages.

It is another object of the present invention to provide relatively simple circuits for controlling a constant armature current motor control system incorporating armature current forcing and voltage limit control.

It is yet another object of the present invention to provide an armature current control system in which negative torque may be provided but in which reverse rotation of the armature may be prevented.

The above and still further objects, features and advantages of the present invention will become apparent upon consideration of the following detailed description of one specific embodiment thereof, especially when taken in conjunction with the accompanying drawings, wherein:

Figure 1:
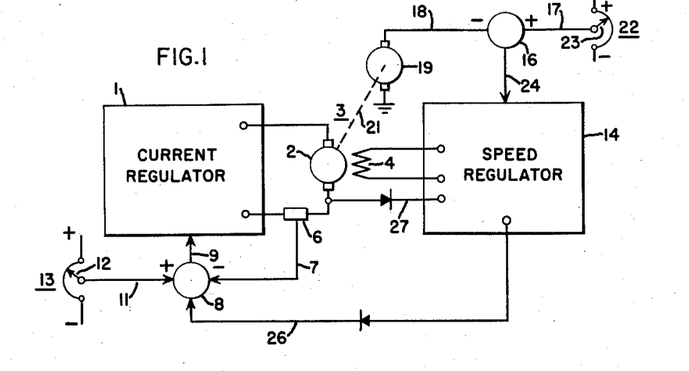
Fig. 1 is a schematic block diagram of the major elements of the control system of the present invention.

Referring specifically to Fig. 1, which is an illustration of a block diagram of the control system of the present invention, a current regulator 1 is employed to maintain, under normal operating conditions, a constant current to an armature 2 of a direct current motor 3 having a field winding 4. In order to maintain the current through the armature 2 constant the current through the armature is sensed by means of a current measuring circuit 6 connected in series between the armature 2 and the current regulator 1. A voltage signal is developed by the shunt, which is indicative of the current flowing through the armature 2 and is applied via a lead 7 to a difference determining network 8 which produces an error signal on an output lead 9 that represents the difference between the desired armature current and the actual armature current. The signal on the lead 9 is generated by determining the difference between the voltage on the lead 7, which is indicative of the actual current through the armature 2, and a voltage on a lead 11 which is indicative of the desired armature current. The lead 11 is connected to a movable tap or wiper 12 of a potentiometer arrangement 13. The wiper 12 is set to produce a voltage on the lead 11 which is indicative of a predetermined desired current through the armature 2 and the signal on the leads 7 and 11 are subtracted from one another so that the signal on the lead 9 indicates the difference between actual and desired armature current and this signal is applied to the current regulator 1 in such a manner as to regulate the current through the armature 2 until the voltage on the lead 9 is reduced toward zero.

The speed at which the armature 2 rotates is determined by the current applied to the motor field winding 4 which is regulated by a speed regulator 14. Information for controlling the current to the field 4 is derived from a difference detector circuit 16 having supplied thereto a speed reference signal via a lead 17 and a signal indicative of the actual speed of the motor which appears on a lead 18. The signal on the lead 18 is generated by a tachometer generator 19 which is driven via a mechanical linkage 21 by the armature 2 of the motor 3. The speed reference signal on the lead 17 is derived from a potentiometer 22 having a wiper 23 which may be variably positioned so as to permit variation of the desired speed of the motor 3. The signal on the lead 18 is subtracted from the signal on the lead 17 and the difference between these signals is applied via a lead 24 to the speed regulator 14 which maintains the current through the field 4 at a proper value so that the signal on the lead 24 is reduced toward zero.

In addition to the circuits thus far described, there is provided an armature current forcing circuit which is located in the current regulator 1 but is responsive to a signal developed in the speed regulator 14 and applied to a lead 26. The signal on lead 26 is applied to the difference determining circuit 8. There is also provided a voltage limit circuit in the speed regulator which is responsive to a voltage on a lead 27 which voltage is proportional to back E.M.F. across the armature 2 of the motor 3.

The armature current forcing signal is employed to force the armature current to rise above that determined by the setting on the potentiometer 12 when additional torque is required but additional field current cannot be supplied since it has already obtained its maximum permissible value. More particularly, the torque produced by a motor is proportional to the armature current times the field current while the speed of the motor is proportional to the field current. Since the current regulator maintains the current through the armature 2 at a constant value an increase in torque requires an increase in the current supplied to the field 4. However, upon the current supplied to the field 4 reaching its maximum value no further load could normally be assumed by the motor without a loss in speed unless the armature current is increased. Therefore, when the current supplied to the field 4 has reached a maximum permissible value as determined by the rating of the machine, a signal appears on the lead 26 which is added to the signal on the lead 11 and therefore produces an error signal at the lead 9 which results in an increase in the current through the armature 2.

The amount of armature current forcing is a function of the original setting of the potentiometer 13 and it is anticipated, in accordance with the present invention, that the setting of the potentiometer 13 is normally such that the armature 2 draws 50% rated current under normal conditions. Therefore, armature current forcing can take place over the upper 50% of the rating of the armature 2, thereby providing a large range of regulation. The mechanics of operation of the forcing circuit may be described briefly as follows: As the load on the armature 2 increases, the speed of the motor is decreased and therefore an error signal appears on the lead 24. The error signal on the lead 24 is applied to the speed regulator 14 which calls for an increase in field current. When the field current has reached maximum value and an error signal still appears on the lead 24 the field current cannot be further increased and a signal now appears on the lead 26 which produces armature current forcing.

The voltage limit circuit which is responsive to the speed voltage of the armature appearing on the lead 27 serves a two-fold purpose. Its first purpose, is to prevent the back E.M.F. of the armature 2 from rising above an acceptable value and the second function is to permit operation of the apparatus in the field speed range. As the first function of the voltage limit signal appears on the lead 27, it is apparent that if the motor is operated above base speed, the back E.M.F. across the armature 2 is greater than the value of the voltage which may be provided by the current regulator 1. Obviously in such a circumstance, the current regulator 1 cannot maintain current through the armature 2 and, in fact, the armature would tend to pump current back into the current regulator. Therefore, when operating above base speed, it is necessary to limit the current applied to the field 4 to a value at which the back E.M.F. of the armature does not become excessive. This function of the speed regulator 14 does not in any way affect armature current forcing in that armature current forcing can occur even though a voltage limit signal appears on the lead 27.

The operation of the voltage limit circuit is such that upon a signal appearing on the lead 27 the current being supplied to the field 4 is reduced, thereby reducing the torque of the motor and reducing the speed. Reduction in speed results in a signal appearing on the lead 24. The signal on the lead 24, in this instance, is ineffective to raise the field current. Thus speed continues to fall further and the signal on lead 24 rises to a value calling for more than rated field current at which time a signal appears on the lead 26 to effect armature current forcing. Armature current forcing continues until the torque of the machine is sufficient to bring the speed voltage on lead 18 up to the signal on the lead 17, thereby reducing the error signal on lead 24 toward zero.

The second function of the voltage limit signal is to permit the operation of the field over a speed range as will be explained in greater detail later.

Figure 2:
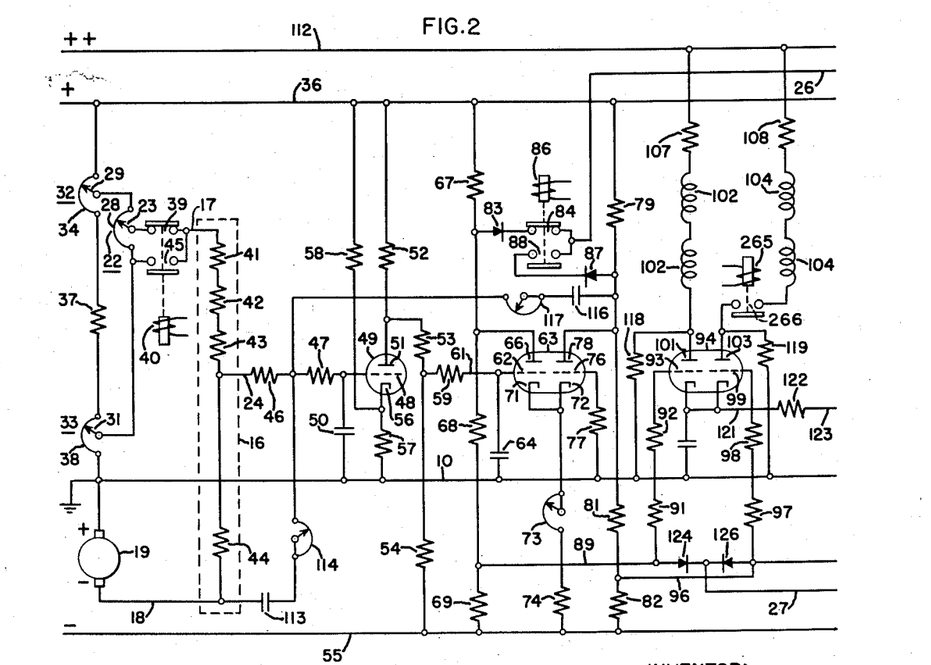
Fig. 2 is a schematic wiring diagram of the field control circuit of the present invention.

Referring now to Figure 2 of the accompanying drawings, which illustrates the speed regulator 14, the difference circuit 16 and other field regulating circuits, a potentiometer 22 has its resistive element 28 connected between sliders 29 and 31 of potentiometers 32 and 33 respectively. The potentiometer 32 has a resistive element 34 having one end connected to a voltage bus 36 and the other end connected through a resistor 37 to one end of a resistive element 38 of the potentiometer 33. The other end of the resistive element 38 is connected to a point of reference potential such as ground. The setting of the potentiometer 32 determines the maximum speed of the machine while the potentiometer 33 is employed to get the minimum machine speed. The end of the resistive element 28 of the speed controlling potentiometer 22, that is not connected to the slider 31 of the potentiometer 32, is connected to the slider 31 of the potentiometer 33. Thus the slider 23 of the potentiometer 22 is movable between a maximum voltage, representing maximum speed as determined by the setting of the slider 29, and a minimum voltage as determined by the setting of the slider 31.

The voltage appearing on the slider 23 is coupled via a normally closed contact 39 of a relay 40 and the lead 17 to the upper end of a voltage dividing chain comprising resistors 41, 42, 43 and 44. The lead 17 is coupled via a normally open contact 45 of relay 40 to the slider 31 of potentiometer 33. The lower end of the chain is connected to the lead 18 which is connected through the tachometer generator 19 to a ground bus 10. The voltage chain 41 through 44 constitutes the difference taking circuit 16 of Fig. 1 and produces a voltage on the lead 24 indicative of the difference between the signals appearing on the leads 17 and 18. The resistors 41, 42 and 43 are employed to render the system adaptable to motors and/or tachometer generators having different characteristics and in a complete system these resistors 41, 42 and 43 may be switched in and out to accept elements of different characteristics.

The voltage on the lead 24 is applied through series resistors 46 and 47 to a grid 48 of a triode amplifier 49 connected as a direct coupled amplifier. The resistors 46 and 47 and a capacitor 50 connected between the grid 48 and ground are employed to filter out ripple introduced by the tachometer generator 19. An anode 51 of the tube 49 is connected to the high voltage bus 36 through a resistor 52 and the junction of the anode 51 and resistor 52 is connected through series connected resistors 53 and 54 to a negative voltage bus 55. A cathode 56 of the tube 49 is connected via a resistor 57 to ground and via a resistor 58 to the voltage bus 36. The resistors 57 and 58 are employed to provide a predetermined bias, slightly above ground, on the cathode 56 whereas the voltage divider including resistors 52, 53 and 54 are employed to reduce the D.C. error signal appearing on the anode 51 to an acceptable D.C. level so that the signals may be coupled directly to the next stage of amplification. Specifically, signals appearing at the junction of resistors 53 and 54 are coupled through a resistor 59 to a lead 61 which in turn is connected to a grid 62 of a left-hand section of a tube 63 connected as a phase-inverter amplifier. The grid 62 is coupled through a capacitor 64 to ground, the resistor 59 and capacitor 64 constituting a further ripple filter for the system. The left-hand section of tube 63 is provided with an anode 66 connected via a resistor 67 to the high voltage bus 36. The anode 66 is further connected through resistors 68 and 69 to the negative voltage bus 55. A cathode 71 of the tube 63 is connected to a cathode 72 of the right-hand section of the tube 63 and is further connected through a variable resistor 73 and a fixed resistor 74 to the negative voltage bus 55. The right-hand section of the tube 63 has a grid 76 connected through a resistor 77 to ground bus 10 and an anode 78 connected through a resistor 79 to the voltage bus 36 and further connected through series connected resistors 81 and 82 to the negative voltage bus 55. Due to the interconnection of the cathodes 71 and 72 and their connection through common resistors to a voltage bus and the further connection of the grid 76 to ground, the tube 63 operates as a push-pull amplifier in which when the anode voltage of one section falls the anode voltage of the other section rises. Upon an increase in signal intensity at the grid 62, conduction through the left-hand section of the tube 63 increases, thereby lowering the voltage at the plate 66 and raising the voltage at the cathode 71 and 72. Raising of the cathode 72 effectively increases the bias on the right-hand section of the tube 63, thereby decreasing conduction through the tube and raising the voltage at the anode 78 of this section of the tube. Therefore, the voltage levels at the anodes of the sections are oppositely directed and this accounts for the push-pull effect of the circuit.

The anode 66 of the tube 63 is further connected through a rectifier 83 and a contact 84 of a relay 86 (see Fig. 3) to the armature current forcing lead 26 while the anode 78 is connected through a rectifier 87 and a contact 88 of the relay 86 to the lead 26. The purpose of the diodes 83 and 87 is to allow only those signals rising above a predetermined value to be applied to the lead 26 as will become apparent subsequently. The purposes of the contacts 84 and 88 of the relay 86 will be discussed subsequently. It suffices to say that depending upon which of the relay contacts 84 and 88 is closed determines whether the signal on the lead 26 is supplied by the left or right-hand sections of the tube 63.

The signals appearing on the anodes 66 and 78 are reduced to the proper D. C. level by the voltage dividers 67, 68 and 69 and 79, 81 and 82 respectively, with the signals being taken from the junction of the resistors 68 and 69 and 81 and 82 respectively. The signal appearing at the junction of the resistors 68 and 69 is connected via a lead 89 and through resistors 91 and 92 to a grid 93 of the left-hand section of a tube 94 connected as a push-pull amplifier. The signal appearing at the junction of resistor 81 and 82 is connected via lead 96 and resistors 97 and 98 to a grid 99 of the right-hand section of the tube 94. Thus the push-pull signals developed by the tube 63 are applied to the grids of the left and right-hand sections of a further amplifier 94. The left-hand section of the amplifier 94 has an anode 101 connected through D.C. control windings 102 of a saturable reactor such as the reactor 250 in Fig. 7. The right-hand section of the tube 94 has an anode 103 connected through D.C. control windings 104 of a similar saturable reactor. The reactor windings 102 and 104 have their opposite ends connected through identical resistors 107 and 108 respectively to a positive voltage bus 112.

Figure 7:
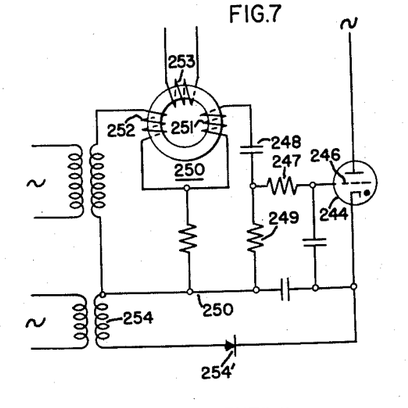
Fig. 7 is a schematic wiring diagram of a phase shift circuit employed to control the various rectifiers of the system.

The saturable reactors such as shown in Fig. 7 are employed to control the phase of the firing of the rectifying devices connected in the supply circuit for the field winding 4 of the motor 3. Before proceeding to a description of the field rectifier circuit, the remaining circuits of Fig. 2 are described. The lead 18 to which the tachometer 19 is connected is connected through a capacitor 113 and a variable resistor 114 to provide a leading speed stability voltage which tends to prevent hunting of the circuit. Also the junction of the resistors 79 and 81, associated with the tube 63, is connected through a capacitor 116 and a variable resistor 117 to the junction of the resistors 46 and 47 to provide a lagging speed stability voltage, Also the anodes 101 and 103 of the tube 94 are connected through resistors 118 and 119 respectively to the grounded voltage bus in order to provide a minimum voltage through the reactor windings 102 and 104 respectively which maintain the rectifying devices in the field circuit at equal conduction so that the net current supplied to the field winding 4 is zero. The cathodes of the right and left-hand sections of the tube 94 are connected together and via a lead 121 and resistor 122 to a lead 123 on which is developed a signal proportional to the current through the field winding 4 of the motor and this signal is always positive so that it produces a negative feedback voltage to the tube 94 and increases the stability of operation of the system. Further, the lead 27 which carries the voltage limit signal is connected through a first rectifier 124 to the lower end of the resistor 91 and is connected through a second rectifier 126 to the lower end of the resistor 97. The operation of the voltage limit circuit on the tube 94 will be discussed subsequently.

Figure 3:
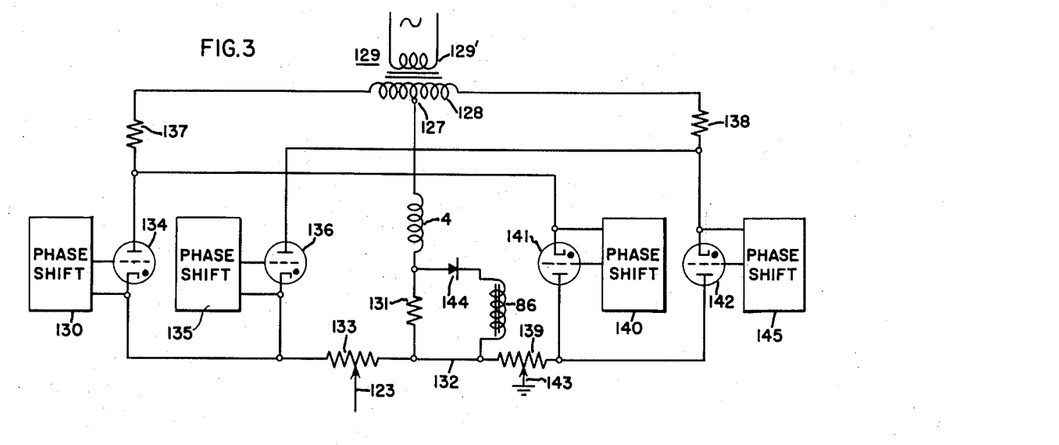
Fig. 3 is a schematic wiring diagram of the forward and reverse field control rectifiers of the apparatus of the present invention.

Proceeding now to Fig. 3 of the accompanying drawings, wherein is illustrated the field winding energization circuit, the shunt field 4 has one end connected to a center tap 127 of a secondary winding 128 of a transformer 129 having a primary 129' connected to a source of alternating current and has its other end connected through a resistor 131 to a voltage bus 132. The bus 132 is connected via a resistor 133 to the cathode of parallel-connected forward control rectifying devices such as thyratrons 134 and 136. The resistor 133 has a variable tap which is connected to the lead 123 in Fig. 2 which supplies a field current feedback signal to the cathodes of the two sections of the tube 94. The anode of the tube 134 is connected through an appropriate resistor 137 to one end of the secondary windings 128 while the thyratron 136 has its anode connected through a further resistor 138 to the other end of the secondary 128. These units therefore provide full wave rectification of the voltage in the secondary winding 128. The bus 132 is further connected through a resistor 139 to the anodes of two reverse control rectifying devices such as thyratrons 141 and 142. The resistor 139 has a variable tap which is connected via a lead 143 to ground. The cathode of the tube 141 is connected to the anode of the tube 134 while the cathode of the tube 142 is connected to the anode of the tube 136, so that the tubes 141 and 142 provide full wave rectification of the current during reverse field current operation.

The firing interval of the thyratron tubes 134, 136, 141 and 142 are controlled by the phase shift circuits 130, 135, 140 and 145 respectively illustrated in block diagram form in Fig. 3 and in detail in Fig. 8 of the drawings, which are in turn controlled by the D.C. windings 102 and 104 of suitable saturable reactors, as will be described subsequently. Upon one or the other sets of rectifiers 134, 136 or 141, 142 being rendered conductive, the voltage on the lead 123 is always positive with respect to ground. Assuming that the thyratrons 134 and 136 are conductive, current flows from the anodes of the tubes through the resistor 133, resistor 131, the field 4 and then through the appropriate portion of the secondary 128 back to the anodes of the tubes. Therefore, the lead 123 in this case is positive with respect to the lead 132 and a proportion of the signal thus developed which appears on the lead 123 may be selected by varying the position of the tap on the resistor 133. Assuming now that the tubes 141 and 142 are conducting, current flows from the lead 132 through resistor 139, through the tubes 141 or 142 and through the appropriate half of the transformer secondary 128 through its center tap 127 and the shunt field 4 back to the lead 132. Therefore, the left-hand end of the resistor 139 is positive and since no current flows through resistor 133, the voltage on the lead 123 is the same as on bus 132. The position of the lead 143 on resistor 139 controls the proportion of the signal across the resistor 139 which appears on the lead 123, the setting of the slider on the resistor 133 in this instance having no effect upon the voltage appearing on the lead 123. Thus, regardless of the polarity of the field current, the feedback signal is always positive. The signal on lead 123 must be positive at all times so as to maintain the cathodes of the tube 94 positive with respect to ground since the voltage dividers to which the anodes 66 and 78 of the tube 63 are connected maintain the leads 89 and 96, and therefore grids 93 and 99, at approximately ground potential.

The resistors 133 and 139 serve the further function of limiting the field current during the stand-by condition. As previously indicated, the resistors 118 and 119 are used to maintain a fixed current under no-load condition through the D.C. control windings 102 and 104 of the saturable reactors. Under these circumstances, the reactors control the phase-shift circuits 130, 135, 140 and 145 so that the tubes 134 and 136 and 141 and 142 are partially turned on for a fixed portion of their total conduction cycle. The resistors 133 and 139 limit the current drawn through the field over this period. The circulating current in the field circuit during stand-by is further affected by the setting of the variable resistor 73 in the cathode circuits of the tube 63. The variable resistor 73 controls the current through the tube 63 and therefore determines, to a certain extent, the voltage at the junction of its resistor 68, 69 and 81, 82. Therefore, the variable resistor 83, which is designated the overlap control, affects and to a certain extent controls the bias on the grids 93 and 99 which obviously determine the stand-by current through the D.C. windings 102 and 104.

The relay 86 having contacts 84 and 88 (see Fig. 2) has one end connected to the lead 132 and its other end connected through a diode 144 to the junction of the field 4 and the resistor 131. The relay 86 and its associated contacts 84 and 88 which are connected in the armature current forcing circuit and more particularly are connected between the anodes 66 and 78 of the tube 63 and the lead 26 are employed to prevent the armature current forcing circuit from operating during a reversal of field current. Specifically, when a change in the direction of torque is required, the polarity of conduction of the field voltage rectifier illustrated in Fig. 3, is initially reversed and then armature current forcing comes into action. The reason for this will appear subsequently. However, since there is a definite time delay between a calling for and an actual reverse in field current, it is desirable, if not necessary, to prevent the armature current forcing circuit from operating during this period of reversal. Therefore, the relay 86 senses the current through the shunt field by means of a dropping resistor 131 and prevents the armature current forcing signal from appearing on the lead 26 until a predetermined reverse current has been effected. The contacts 84 and 88 of the relay in conjunction with the diodes 83 and 87 function to transmit to lead 26 a signal from only one section of tube 63 at a time. Thus, armature current forcing can occur only when field current is in the proper direction with respect to the signal applied to the tube 63; that is, the field current is flowing in the direction called for by the signal applied to the grid 62 of tube 63.

Figure 4:
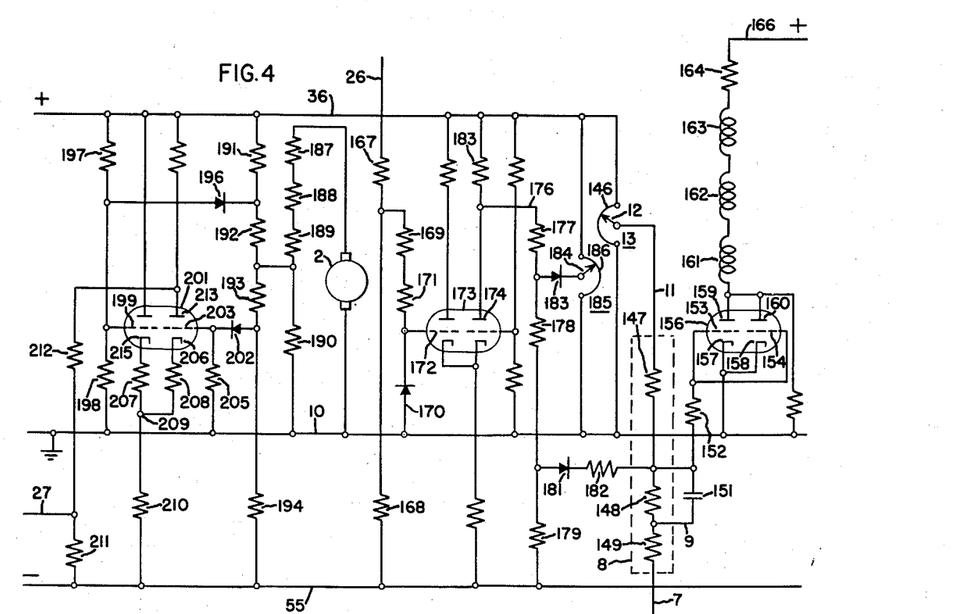
Fig. 4 is a schematic wiring diagram of the armature current control circuits and the armature voltage limit generating circuit.

Referring now to Fig. 4 of the accompanying drawings which illustrates the armature control circuits and the armature voltage limit circuit of the present invention, the potentiometer 13, which provides the current reference signal, has a potentiometer resistor 146 having one end connected to the high voltage bus 36 and the other end grounded. The slider 12 of the potentiometer 13 is connected through three series connected resistors 147, 148 and 149 to the lead 7 on which is developed the armature current feedback signal that is to be compared with the signal developed on the slider 12 for purposes of maintaining the current through the armature 2 constant. The setting of the slider 12 determines the constant current rating of the machine and in accordance with the present invention this slider is set to maintain fifty percent of maximum current flowing through the armature 2. The signal developed at the junction of the resistors 147 and 148, which represents the error signal from which the current control system is to operate, is fed via resistor 152 to grids 153 and 154 of a dual triode 156 having both sections connected in parallel. The cathodes of 157 and 158 are connected to ground while the anodes 159 and 160 are connected through three D.C. windings 161, 162 and 163 and a limiting resistor 164 to a high voltage bus 166. Thus, the current through the D.C. control windings 161, 162 and 163 of the armature current control saturable reactor is determined by the difference in the voltage on the leads 7 and 11 which represents the difference between the desired and actual armature current.

The armature current forcing signal comes in on the lead 26 which is connected via series arranged resistors 167 and 168 to the negative voltage bus 55. The junction of the resistors 167 and 168 is connected via resistors 169 and 171 to a grid 172 of the left-hand section of a tube 173. A diode 170 may be connected between the grid 172 and the ground bus 10. The right and left-hand sections of the tube 173 are connected in-cascade such that an increase in signal on the grid 172 produces an increase in signal on a lead 176 connected to an anode 174 of the right-hand section of the tube 173. The lead 176 is connected via resistors 177, 178 and 179 to the negative voltage bus 55. The voltage appearing at the junction of the resistors 178 and 179 is applied via rectifier 181 and resistor 182 to the junction of resistors 147 and 148 and therefore the armature current forcing signal is applied at this point as a positive and increasing voltage when armature forcing is called for. The resistors 177, 178 and 179 and the resistor 183 connected between the voltage bus 36 and the anode 174 is such with respect to the voltage divider including potentiometer 13 and resistors 147, 148 and 149 that the junction of resistors 178 and 179 is normally negative with respect to the junction of resistors 147 and 148. Therefore, the diode 181 is normally non-conducting and only when the armature current forcing voltage appearing on the lead 26 has obtained a predetermined positive value does the voltage across the diode 181 rise to a sufficient value to permit conduction between these two junctions which thereby raises the voltage applied to the tube 156 to initiate armature current forcing. An armature current forcing signal limiting circuit must be supplied to prevent the armature from being operated at excessive currents. In order to accomplish this result there is provided a diode 183 connected between the junction of resistor 177 and 178 and a slider 184 of a potentiometer 185 having a resistive element 186 connected between ground and the high voltage bus 36. The setting of the arm 184 on the resistor 186 determines the point at which the diode 188 conducts and when this point of conduction is obtained the voltage at the junction of resistors 177 and 178 cannot rise above the voltage on the slider 184 and therefore the extent of the excursion of the armature current forcing signal is limited.

Referring now to the circuit for producing the voltage limit signal, a voltage divider comprising resistors 187, 188, 189 and 190 is connected in series across the armature 2 of the motor 3. A second voltage divider is provided between the high voltage bus 36 and the negative voltage bus 55 which comprises resistors 191, 192, 193 and 194. The junction of the resistors 189 and 190 is connected to the junction of the resistors 192 and 193 of the second mentioned voltage divider circuit. The junction of the resistors 191 and 192 is connected through a diode 196 to the junction of resistors 197 and 198 connected across the bus 36 and ground. The same junction is connected to a grid 199 of the left-hand section of a tube 201 connected as a phase-inverter amplifier. The junction of resistors 193 and 194 is connected through a diode 202 connected in reverse direction to the diode 196 to a grid 203 of the right-hand section of the tube 201 and further through a resistor 205 to ground. Cathodes 215 and 206 of the left and right-hand sections of the tube 201 are connected respectively through resistors 207 and 208 to a common junction 209 in which is connected to a further resistor 210 to the negative voltage bus 55. It is the function of the circuit just described which includes the elements 187 through 210 to produce at the junction of resistors 211 and 212 a negative voltage signal when the back E.M.F. across the armature 2 exceeds a predetermined magnitude regardless of the polarity of this back E.M.F.

The voltage levels at which this section of the apparatus comes into operation is determined by the biases across the rectifiers 196 and 202. The bias on the anode of the diode 196 is determined by the relative values of the resistors 197 and 198 on the one hand and the resistors 191 and 194 on the other. Upon the back E.M.F. across the armature 2 obtaining a maximum permissible negative value, the voltage at the junction of the resistors 189 and 190 obtained such a value that the voltage at the junction of the resistors 191 and 192 renders the diode 196 conductive and the voltage at junction of resistors 197 and 198 tends to follow the voltage at the junction of the resistors 191 and 192. In consequence, the current flowing through the left-hand section of 201 is reduced thereby reducing the negative voltage on the cathode 206 of the right-hand section of the tube and increasing conduction through this section of the tube. With an increase in current through the right-hand section of the tube, the voltage on its anode decreases and produces a reduction of the voltage at the junction of resistors 211 and 212 so that the voltage on the voltage limit conductor 27 is also reduced. Alternatively, should the voltage across the armature achieve its maximum safe positive value, the voltage at the junction of resistors 193 and 194 is increased to effect conduction of the diode 202 which increases the voltage on the grid 203 and again produces an increase of current through the tube 201 which effects an increase in voltage on the voltage feedback lead 27.

Referring again to Fig. 2, upon the voltage on the lead 27 going sufficiently negative, the diodes 124 and 126 are rendered conductive and reduce the voltages on the grids 93 and 99 of the tube 94. Such reduction on voltage on the grids 93 and 99 reduces the current flowing through the D.C. control windings 102 and 104 of the saturable reactors 103 and 106 and reduces the field current until the voltage on the lead 27 is raised to a value indicating safe operation of the motor. It can be seen that the voltage limit circuit has no effect whatsoever upon the armature current forcing circuit since the voltage limit circuit operates upon a stage in the system which follows the stage from which the armature current forcing signal is derived.

Under normal armature current forcing conditions, the voltage limit circuit is not called upon for action. However, operation of the voltage limit circuit may well bring the armature current forcing circuit into operation. If the desired speed of the machine is increased above base speed, initially the speed voltage reference derived from the potentiometer 22 and the voltage representative of actual speed derived from the tachometer 19 is such as to produce an error signal on the lead 24 which in proceeding through the system normally would call for an increase in field current. Since operation is above base speed, the back E.M.F., produced by the field called for by the speed control circuit, could be above the rated voltage of the machine at which time the voltage available from the current regulator would be insufficient to force current through the armature 2. Specifically, the voltage available at the current regulator would in this instance be less or equal to the voltage developed across the armature 2 and obviously the armature 2 would lose speed to the extent necessary to reduce its back E.M.F. to a point where the current regulator 1 could again supply current to the motor. Therefore, an increase in the speed reference voltage derived from the potentiometer 22 could not produce an actual increase of speed of the motor and in fact might produce a decrease in the speed. With the voltage limit circuit in operation, as soon as the back E.M.F. across the armature 2 obtains a predetermined value, a signal of sufficient magnitude is applied to the lead 27 to reduce the voltage on the grids of the tube 94 to hold the current through the field 4 at a value which will maintain the armature voltage within its predetermined value. Although an increase in field current cannot be effected, a voltage is maintained on the lead 24 of a greater magnitude than previously since the field current has been reduced and therefore the armature speed and tachometer voltage are reduced. This brings into effect the armature forcing circuit since at this time the voltage on the lead 26 rises to a value sufficient to overcome the bias across the rectifier 181, see Fig. 4, and introduces an armature current forcing signal into the armature current control circuit. The armature current is now inceased so as to increase the available torque; that is, field current times armature current and the desired speed increase is now effected.

Armature current forcing may occur in the absence of a voltage limit signal when the speed and torque demands are greater than can be met by full rated field current and half rated armature current. Such conditions usually arise when the load on the motor increases above 50% of rated torque which is the maximum torque that can be developed without armature current forcing.

The system of the present invention is intended to have four different combinations of speed and torque characteristics. Specifically, under a first set of conditions the speed and the torque are both in the same direction or what may be called the forward direction. Operation at a set speed and at a set armature currently merely includes the operation of the armature current regulator and the field current regulator. However, an overhauling load may be encountered; that is, one which tends to overdrive the armature at a speed faster than is required by the setting of the potentiometer 22. In such an instance, the voltage on the lead 24 is suddenly reversed to produce reversed field current and to eliminate any armature current forcing signal previously developed. The reverse field builds up to the extent necessary to meet the load requirement anf if the full reverse torque available from complete reversal of the field current is still insufficient, the signal developed by the tube 63 increases and becomes sufficient to generate an armature current forcing signal that brings the armature current forcing circuit into operation. If necessary to meet the load requirements, the armature current may also be raised to maximum rated so that full reverse torque is developed even though the speed or direction of rotation is still in the forward direction.

The motor control system of the present invention is intended to provide reverse speed and reverse torque; that is, motoring in the reverse direction and this is indicated in the third quadrant. In order to effect reverse speed and torque, only the field current must be capable of reversal. Since reverse motoring is provided, the system must also be capable of handling overhauling loads in the reverse direction and provide reverse speed with forward torque. The operation of the circuit is similar with respect to reverse speed and forward torque is similar to its operation with forward speed and reverse torque. In this instance, however, the tachometer provides a positive going signal which has the same effect upon the armature current forcing circuit and a reverse effect upon the field control circuit; that is, the tube 94 now effects forward current through the field even though the armature is turning in the reverse direction. Armature current forcing is again effected when the field current obtains full forward magnitude.

The ability of the circuit to reverse the field current also provides for regenerative braking of the motor. Specifically, when it is desired to bring the motor to a stop the contact 39 is opened and contact 45 is closed, by relay means 40 which form no part of the present invention, thereby connecting the lead 17 initially to the slider 31 which determines minimum speed of the system. This reduction in the positive voltage applied to the lead 17 produces a large voltage imbalance between the tachometer voltage and the speed reference voltage and therefore an error signal appears on the lead 24. This signal is of such polarity that the tube 94 is operated to reverse the current flowing through the field winding 4 and therefore applies reverse torque to the motor to effect regenerative braking thereof. Once the motor has obtained the low speed which is determined by the setting of the potentiometer 31, additional circuits take over to bring the motor to a complete stop.

Figure 5:
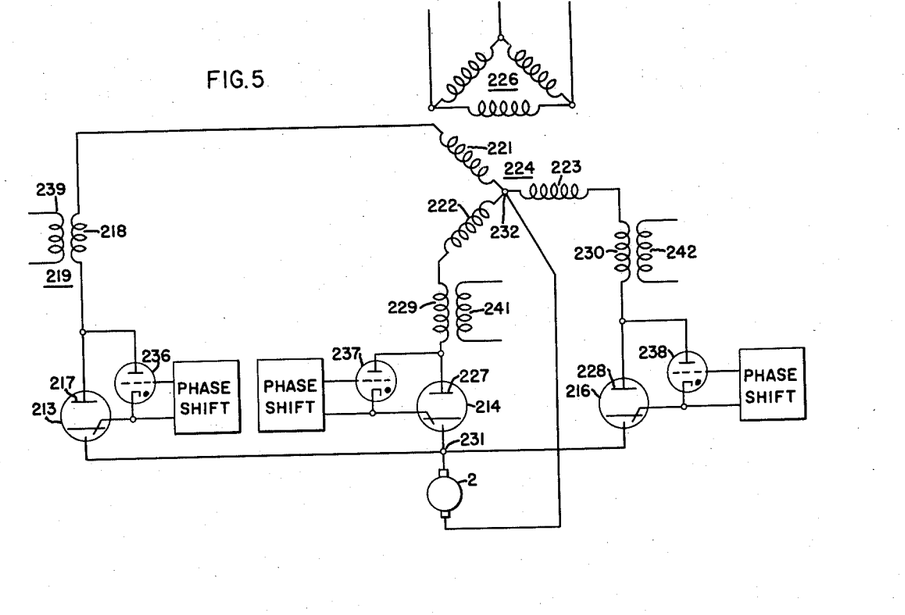
Fig. 5 is a schematic diagram of the armature current rectifiers.
Figure 6:
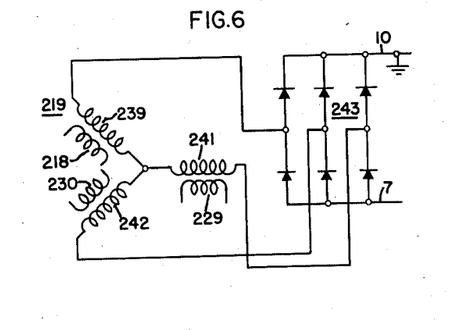
Fig. 6 is a schematic wiring diagram of the armature current feedback voltage circuit.

Reference is now made to Fig. 5 of the accompanying drawing which illustrates the armature current rectifier circuits. Current is supplied to the armature 2 from a three-phase power supply which is rectified by three rectifying devices such as ignitrons 213, 214 and 216. The ignitron 213 has its anode 217 connected through primary winding 218 of a current transformer 219 to one end of a secondary winding 221 of the Y-connected secondaries 221, 222 and 223 of a three-phase transformer 224 having delta-connected primary windings generally designated by reference numeral 226. Anode 227 of the ignitron 214 and anode 228 of ignitron 216 are connected respectively, through primary windings 229 and 230 of current transformers to the unconnected ends of the Y-connected secondary windings 222 and 223. The cathodes of the ignitrons 213, 214 and 216 are connected together to a junction 231 which is connected to one end of the armature 2 of the motor 3. The other end of the armature 2 is connected to the center tap 232 of the Y-connected secondary windings 221, 222 and 223.

The firing of the ignitrons 213, 214 and 216 are controlled by thyratrons 236, 237 and 238 respectively in conventional manner. The firing of each thyratron is controlled by a phase shift circuit of the same type as employed to control the firing of the thyratrons in the field circuit of Fig. 3, one of these circuits being illustrated in Fig. 7 of the accompanying drawings.

The rectifier circuit of Fig. 5 is basically conventional and provides for three phase half-wave rectification of the three phase currents applied to the primary winding 226 of the transformer 224. It is apparent that current can flow in only one direction through the armature 2 and that the magnitude of this current is determined by the firing angle of the voltage applied to the ignitor of the ignitrons with respect to the phase angle of the anode voltage of the ignitrons. Inasmuch as this circuit is conventional, additional details are not considered to be necessary.

The current transformer primaries 218, 229 and 230 have secondary windings, see Fig. 6, 239, 241 and 242 respectively. The currents generated in each of the windings 239, 241 and 242 are proportional to the current in a different one of the phase circuits and are rectified in a three phase rectifier generally designated by the reference numeral 243 to produce a D.C. current on the lead 7 indicative of the total armature current. The voltage on the lead 7 is applied to the bottom of the resistor 149 illustrated in Fig. 4 of the accompanying drawings and is employed as the current feedback signal for maintaining constant current through the armature 2.

Referring now to Fig. 7 of the accompanying drawings, a tube 244 is taken to represent any one of the tubes 134, 136, 141, 142, 236, 237 or 238. The tube is provided with a grid 246 connected through a resistor 247 to the junction of a capacitor 248 and a resistor 249. The lower end of the resistor 249 is connected to a voltage bus 250 while the upper end of the capacitor 248 is connected through series connected A.C. windings 251 and 252 of a saturable reactor having a D.C. winding such as illustrated in Fig. 2 and Fig. 4, and specifically may be the saturable reactor having the D.C. control winding 102 or 104 as illustrated in Fig. 2 or the D.C. control windings 161, 162 and 163 of the armature control circuit illustrated in Fig. 4. These D.C. windings which are illustrated as D.C. control windings 253 of reactor 250 in Fig. 7 control the phase of the voltage applied to the junction of resistors 247 and 249 since they vary the reactive component in series with the capacitor 248 and the resistor 249. Therefore, the phase angle of this voltage relative to the voltage on the anode of the tube 44 may be controlled in view of the fact that the source for the initial D.C. grid voltage is derived from a transformer secondary 254 through a rectifier 254'.

Since the field winding 4 is supplied from a field reversing circuit, as illustrated in Fig. 3, both positive and negative torques may be developed within the motor 3 and forward and reverse rotation may be effected. In some instances, it is desirable that the motor not be permitted to reverse and a safety device which may be brought into operation to prevent reversal if so desired is also provided in accordance with the present invention.

Figure 8:
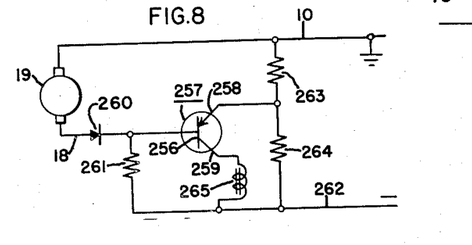
Fig. 8 is a schematic wiring diagram of the anti-reversing circuit of the present invention.

Referring now to Fig. 8 of the accompanying drawings, there is illustrated an anti-reversing circuit which may be provided where it is desired that the armature rotate in only one desired direction. The anti-reversing circuit is responsive to the voltage on the tachometer lead 18. The lead 18, in addition to being connected to resistor 44, is connected through a diode 260 to base electrode 256 of a transistor 257 having an emitter 258 and a collector 259. The base 256 is further connected through a biasing resistor 261 to a negative voltage bus 262. The emitter is connected to the junction of resistors 263 and 264 which are connected between a ground terminal and the negative voltage bus 262. A winding of an anti-reversing relay 265 is connected between the collector 259 of the transistor 257 and the negative voltage bus 262.

The operation of the anti-reversing circuit is based upon the fact that in order to rotate the armature 2 of the motor 3 in a reverse direction, reverse field must be developed by the field control circuit since the armature current cannot be reversed. Further, the circuit must not interfere with the reversal of the field required to produce negative torque for the purpose of regenerative braking and to decelerate overhauling loads. Therefore, the circuits prevents negative field when the tachometer voltage is in the neighborhood of zero voltage, indicating zero speed of the armature. As long as there is some amount of forward speed, a reverse field cannot effect reversal of the armature. Therefore, when there is some amount of forward speed, the anti-reversing circuit does not function. The voltage divider 263—264 and the bias resistor 261 are chosen such that if the voltage of the tachometer is in the neighborhood of zero voltage and is the proper polarity, the relay 265 is energized. Specifically, when the tachometer voltage rises above zero and has a polarity (as shown) indicative of the desired direction of operation, the relay 265 becomes energized at which time it closes its normally open contact 266 connected between the plate 103 of the tube 94 and the D.C. control winding 104 of the saturable reactor for controlling the conduction of the tubes 141 and 142. Therefore, only when the armature is turning in the desired direction and has a speed over a predetermined minimum is the contact 266 closed to permit reverse torque to be developed. However, if the tachometer voltage falls in the neighborhood of zero voltage indicating no rotation of the armature or if the tachometer voltage has the reverse polarity indicating rotation of the armature in the reverse direction, the relay 265 becomes deenergized to open its contact 266 and remove reverse field from the system so as to prevent operation in the reverse direction.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim as new and desire to secure by Letters Patent of the United States is:

1. A control system for a direct current motor comprising an armature current supply circuit, control means for regulating said armature current supply circuit to maintain the armature current at a predetermined value, means for generating a speed signal proportional to the speed of rotation of the armature of a motor to be controlled, a source of reference signal, means for developing an error signal proportional to the difference between said reference signal and said speed signal, an armature current forcing circuit connected to said control means for effecting an increase in said armature current upon said error signal obtaining a predetermined magnitude, said armature current forcing circuit having an input lead, a field current supply circuit, a field control circuit for controlling current flow through said field current supply circuit, said field control circuit being responsive to said error signal to effect control of said field supply circuit and including a phase-inverter amplifier having two output circuits and an input circuit, means for applying said error signal to said input circuit, a relay connected to be energized by the current flowing through said field current supply circuit, said relay having two sets of contacts, one of which is open when the other is closed, each of said sets of contacts being connected between said input lead to said armature current forcing circuit and a different one of said output circuits of said phase-inverter amplifier.

2. A direct current motor control system comprising an armature current supply circuit, control means for regulating said armature current supply circuit to maintain the armature current constant at a predetermined, at will variable value, means for generating a speed signal proportional to the speed of rotation of the armature of a motor to be controlled, a source of reference speed signal, means for developing an error signal proportional to the difference between said reference speed signal and said speed signal, an armature current forcing circuit connected to said control means for effecting an increase in said armature current upon said error signal obtaining a predetermined magnitude, said armature current forcing circuit having an input lead, a field current supply circuit, a field control circuit for controlling current flow through said field current supply circuit, said field control circuit including a cascaded amplifier having at least two stages, means for applying said error signal to said first stage, means for coupling signals developed by said first stage to said input lead of said armature current forcing circuit upon said error signal obtaining a predetermined amplitude, said second stage having means for controlling said field current supply circuit, means for developing a control signal proportional to the voltage of the armature of the motor to be controlled and limiting means for preventing said second stage from increasing current in said field current control circuit upon said control signal obtaining a predetermined amplitude.

3. A direct current motor control system comprising an armature current supply circuit, control means for regulating said armature current supply circuit to maintain the armature current constant at a predetermined, at will variable value, means for generating a speed signal proportional to the speed of rotation of the armature of a motor to be controlled, a source of reference speed signal, means for developing an error signal proportional to the difference between said reference speed signal and said speed signal, an armature current forcing circuit connected to said control means for effecting an increase in said armature current upon said error signal obtaining a predetermined magnitude, said armature current forcing circuit having an input lead, a field current supply circuit, a field control circuit for controlling current flow through said field current supply circuit, said field control circuit being responsive to said error signal to effect control of said field supply circuit and including a phase-inverter amplifier having two output circuits and an input circuit, means for applying said error signal to said input circuit, means for applying the signals developed in one of said output circuits to said input lead of said armature current forcing circuit, a two stage push-pull amplifier, means for applying the signals developed in the other of said output circuits to said push-pull amplifier, means responsive to current flow through one or the other stages of said push-pull amplifier to control current flow through said field current supply circuit in forward or reverse directions, respectively, and means responsive to the value of the voltage across the armature of the motor to be controlled rising above a predetermined value to prevent an increase in the current through either of said stages of said push-pull amplifier.

4. A direct current motor control system comprising an armature current supply circuit, means for regulating said armature current supply circuit to maintain the armature current constant at a predetermined variable value, first and second electric valve means for supplying forward and reverse currents, respectively, to a field winding of a motor to be controlled, means for generating a speed signal proportional to the speed of rotation of the armature of the motor to be controlled, control means responsive to the speed signal for regulating said electric valve means to maintain said speed signal at a predetermined, at will variable value, and means for disabling said second electric valve means upon said speed voltage obtaining a value indicating almost zero speed of the armature of the motor to be controlled.

5. A direct current motor control system comprising an armature current supply circuit, means for regulating said armature current supply circuit to maintain the armature current constant at a predetermined variable value, first and second electric valve means for supplying forward and reverse currents, respectively, to a field winding of a motor to be controlled, means for generating a speed signal proportional to the speed of rotation of the armature of a motor to be controlled, control means responsive to the speed signal for regulating said electric valve means to maintain said speed at a predetermined variable value, a normally closed switch connected in said control means for said second electric valve means, and means responsive to the speed signal obtaining a predetermined value of almost zero for opening said switch.

6. A direct current motor control system comprising an armature current supply circuit, means for regulating said armature current supply circuit to maintain armature current constant, a field current supply circuit, means for generating a speed signal proportional to the speed of the motor to be controlled, control means for regulating said field current supply circuit to maintain said speed signal at a predetermined, at will variable value, a phase-inverter amplifier comprising a pair of electron tubes each having an output circuit and each having first and second input circuits, first circuit means for applying to each of said first input circuits a voltage proportional to the voltage of the armature when said voltage exceeds a predetermined magnitude and second circuit means for applying to each of said second input circuits a voltage proportional to said field current, said control means being responsive to the voltage in said output circuits of said phase-inverter amplifier to limit field current.

7. A control system for a direct current motor comprising electron current control devices for supplying forward and reverse currents to the field winding of a motor to be controlled, means for generating a voltage proportional to the speed of rotation of the armature of said motor, control means responsive to said speed voltage for regulating said electron current devices to maintain said speed voltage at a predetermined value, a feedback circuit including impedance means connected in series with said electron current devices, means for deriving a signal from at least a portion of said impedance means, and means for feeding said derived signal back to said control means, said derived signal always being of the same polarity and being proportional to the field current of said motor.

8. A control system for a direct current motor having an armature and a field winding, comprising first and second electron discharge devices for supplying forward and reverse currents respectively to the field winding of a motor to be controlled, means for generating a voltage proportional to the speed of rotation of the armature of said motor, control means responsive to said speed voltage for regulating said electron discharge devices and thereby maintain said speed voltage at a predetermined value, a negative feedback circuit including first and second impedance devices coupled in series with said first and second electron discharge devices and in series with said field winding, means for deriving a signal from across at least a portion of both of said impedance devices, and means for feeding said derived signal back to said control means, said derived signal always being of the same polarity and being proportional to the field current of said motor.

9. A control system for a direct current motor having an armature and a field winding comprising means for generating a signal proportional to the speed of rotation of the armature of a motor to be controlled, a reference signal source, means coupled to said generating means and to said source for developing an error signal that is proportional to the relative values of said reference signal and said speed signal, an armature current supply circuit, an armature current control circuit coupled to said armature current supply circuit for maintaining said armature current at a predetermined value, an armature current forcing circuit coupled to said armature current control circuit for effecting an increase in the armature current in response to said error signal reaching a predetermined value, a field current supply circuit, a field current control circuit coupled to said field current supply circuit for controlling said field current supply circuit, said field current control circuit being responsive to said error signal to effect control of said field current supply circuit, and means coupled to said armature current forcing circuit for disabling said armature current forcing circuit in response to a direction of current flow in said field current supply circuit that is opposite to the direction of field current flow called for by said error signal.

References Cited in the file of this patent

UNITED STATES PATENTS 2,421,632     Livingston _______________ June 3, 1947

UNITED STATES PATENT OFFICE
CERTIFICATION OF CORRECTION

Patent No. 2,964,691            December 13, 1960

Edward H. Dinger

It is hereby certified that error appears in the above numbered patent requiring correction and that the said Letters Patent should read as corrected below.

Column 5, line 24, for "get" read -- set --; column 6, line 50, after "via" insert -- a --; column 11, line 39, for "currently" read -- current --; line 49, for "anf" read -- and --; column 13, line 50, for "circuits" read -- circuit --.

Signed and sealed this 13th day of June 1961.

(SEAL)
Attest:

ERNEST W. SWIDER
Attesting Officer

DAVID L. LADD
Commissioner of Patents